(12) United States Patent
Machnicki et al.

(10) Patent No.: US 9,009,377 B2
(45) Date of Patent: Apr. 14, 2015

(54) EDGE-TRIGGERED INTERRUPT CONVERSION IN A SYSTEM EMPLOYING LEVEL-SENSITIVE INTERRUPTS

(71) Applicant: Apple Inc., Cupertino, CA (US)

(72) Inventors: Erik P Machnicki, San Jose, CA (US); Deniz Balkan, Santa Clara, CA (US); Manu Gulati, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 13/666,132

(22) Filed: Nov. 1, 2012

(65) Prior Publication Data

US 2014/0122759 A1    May 1, 2014

(51) Int. Cl.
*G06F 13/24*    (2006.01)

(52) U.S. Cl.
CPC .................................. *G06F 13/24* (2013.01)

(58) Field of Classification Search
USPC .................................................. 710/260–269
See application file for complete search history.

(56) References Cited

U.S. PATENT DOCUMENTS

| | | | |
|---|---|---|---|
| 5,187,781 A * | 2/1993 | Heath ........................... | 710/262 |
| 5,261,107 A | 11/1993 | Klim et al. | |
| 5,819,096 A * | 10/1998 | Nelson et al. ................. | 710/260 |
| 6,145,047 A | 11/2000 | Garinger et al. | |
| 6,604,161 B1 * | 8/2003 | Miller ........................... | 710/260 |
| 6,735,655 B1 * | 5/2004 | Chilton ......................... | 710/262 |
| 7,003,611 B2 | 2/2006 | Arndt | |
| 7,181,559 B2 * | 2/2007 | Barth et al. ................... | 710/263 |
| 7,685,347 B2 * | 3/2010 | Gibbs ........................... | 710/264 |
| 7,805,557 B2 * | 9/2010 | Kimelman et al. ........... | 710/264 |
| 8,032,686 B2 | 10/2011 | O'Brien et al. | |
| 8,135,884 B1 * | 3/2012 | Sullam et al. ................. | 710/48 |
| 8,166,223 B2 | 4/2012 | Bennett | |
| 2005/0144346 A1 * | 6/2005 | Barth et al. ................... | 710/260 |
| 2005/0289271 A1 | 12/2005 | Martinez et al. | |
| 2006/0047877 A1 * | 3/2006 | Winkler et al. ............... | 710/260 |
| 2008/0126617 A1 * | 5/2008 | Brownlow et al. ............. | 710/48 |
| 2009/0164739 A1 | 6/2009 | Harikumar et al. | |
| 2010/0180060 A1 * | 7/2010 | Biran ............................ | 710/264 |
| 2011/0179413 A1 | 7/2011 | Subramanian et al. | |
| 2012/0221757 A1 * | 8/2012 | Craddock et al. ............. | 710/266 |

OTHER PUBLICATIONS

U.S. Appl. No. 13/653,151, filed Oct. 16, 2012, inventor Gulati et al.
PCI Local Bus Specification Revision 2.3& 3.0 Draft, MSI-X ECN, Message Signaled Interrupts, Joe Cowan, Hewlett-Packard Company, Jun. 10, 2003, pp. 1-23.

* cited by examiner

*Primary Examiner* — Raymond Phan
(74) *Attorney, Agent, or Firm* — Meyertons, Hood, Kivlin, Kowert & Goetzel, P.C.; Lawrence J. Merkel

(57) ABSTRACT

In an embodiment, a system includes an interrupt controller, one or more CPUs coupled to the interrupt controller, a communication fabric, one or more peripheral devices configured to generate interrupts to be transmitted to the interrupt controller, and one or more interrupt message circuits coupled to the peripheral devices. The interrupt message circuits are configured to generate interrupt messages to convey the interrupts over the fabric to the interrupt controller. Some of the interrupts are level-sensitive interrupts, and the interrupt message circuits are configured to transmit level-sensitive interrupt messages to the interrupt controller. At least one of the interrupts is edge-triggered. The system is configured to convert the edge-triggered interrupt to a level-sensitive interrupt so that interrupts may be handled in the same fashion.

18 Claims, 6 Drawing Sheets

EDGE-TRIGGERED INTERRUPT CONVERSION IN A SYSTEM EMPLOYING LEVEL-SENSITIVE INTERRUPTS

BACKGROUND

1. Field of the Invention

This invention is related to the field of interrupts in computer systems and, more particularly, to handling edge-triggered and level-sensitive interrupts.

2. Description of the Related Art

Computing systems generally include one or more processors that serve as central processing units (CPUs), along with one or more peripherals that implement various hardware functions. The CPUs execute the control software (e.g. an operating system) that controls operation of the various peripherals. The CPUs can also execute applications, which provide user functionality in the system. Additionally, the CPUs can execute software that interacts with the peripherals and performs various services on the peripheral's behalf.

The peripherals can cause the CPUs to execute software on their behalf using interrupts. Generally, the peripherals issue an interrupt to the CPU, typically by asserting an interrupt signal to an interrupt controller that controls the interrupts going to the CPU. The interrupt causes the CPU to stop executing its current software task, saving state for the task so that it can be resumed later. The CPU can load state related to the interrupt, and begin execution of an interrupt service routine. The interrupt service routine can be driver code for the peripheral, or may transfer execution to the driver code as needed. Generally, driver code is code provided for a peripheral device to be executed by the CPU, to control and/or configure the peripheral device.

Interrupts can be defined to be either edge-triggered or level-sensitive. An edge-triggered interrupt signals an interrupt via the assertion of the interrupt signal. The occurrence of the rising edge (or falling edge, for active low interrupt signals) is the request for interrupt. The level on the edge-triggered interrupt signal has no particular meaning, and the interrupt signal need not remain asserted to continue the request for interrupt. On the other hand, a level-sensitive interrupt indicates a request for interrupt via the level of the signal. Thus, the level-sensitive interrupt signal is asserted (e.g. high, for an active-high interrupt signal, or low, for an active-low interrupt signal) and the asserted level indicates that request. The request remains active until the deassertion of the level-sensitive interrupt signal (e.g. low, for an active-high interrupt signal, or high, for an active-low interrupt signal). Deassertion of the level-sensitive interrupt signal indicates that no interrupt is requested. In some cases, deassertion can happen even if the interrupt has not yet been serviced.

In a system that includes both edge-triggered and level-sensitive interrupts, communicating the interrupts through the system and managing the interrupts correctly can be a challenge.

SUMMARY

In an embodiment, a system includes an interrupt controller, one or more CPUs coupled to the interrupt controller, a communication fabric, one or more peripheral devices configured to generate interrupts to be transmitted to the interrupt controller, and one or more interrupt message circuits coupled to the peripheral devices. The interrupt message circuits are configured to generate interrupt messages to convey the interrupts over the fabric to the interrupt controller. Some of the interrupts are level-sensitive interrupts, and the interrupt message circuits are configured to transmit level-sensitive interrupt messages to the interrupt controller. At least one of the interrupts is edge-triggered. The system is configured to convert the edge-triggered interrupt to a level-sensitive interrupt so that interrupts may be handled in the same fashion.

In one embodiment, edge-triggered interrupts may be converted to level-sensitive interrupts at the interrupt controller (e.g. the edge-triggered interrupts may be treated as an interrupt set message corresponding to a level-sensitive interrupt). In another embodiment, the interrupt message circuits may convert the edge-triggered interrupts into level-sensitive interrupt messages. In some embodiments, the interrupt message circuits may queue the edge triggered interrupts and generate a level-sensitive interrupt. Software executed in response to the level-sensitive interrupt may read the edge-triggered interrupts from the queue and process the interrupts.

BRIEF DESCRIPTION OF THE DRAWINGS

The following detailed description makes reference to the accompanying drawings, which are now briefly described.

Figure 1:
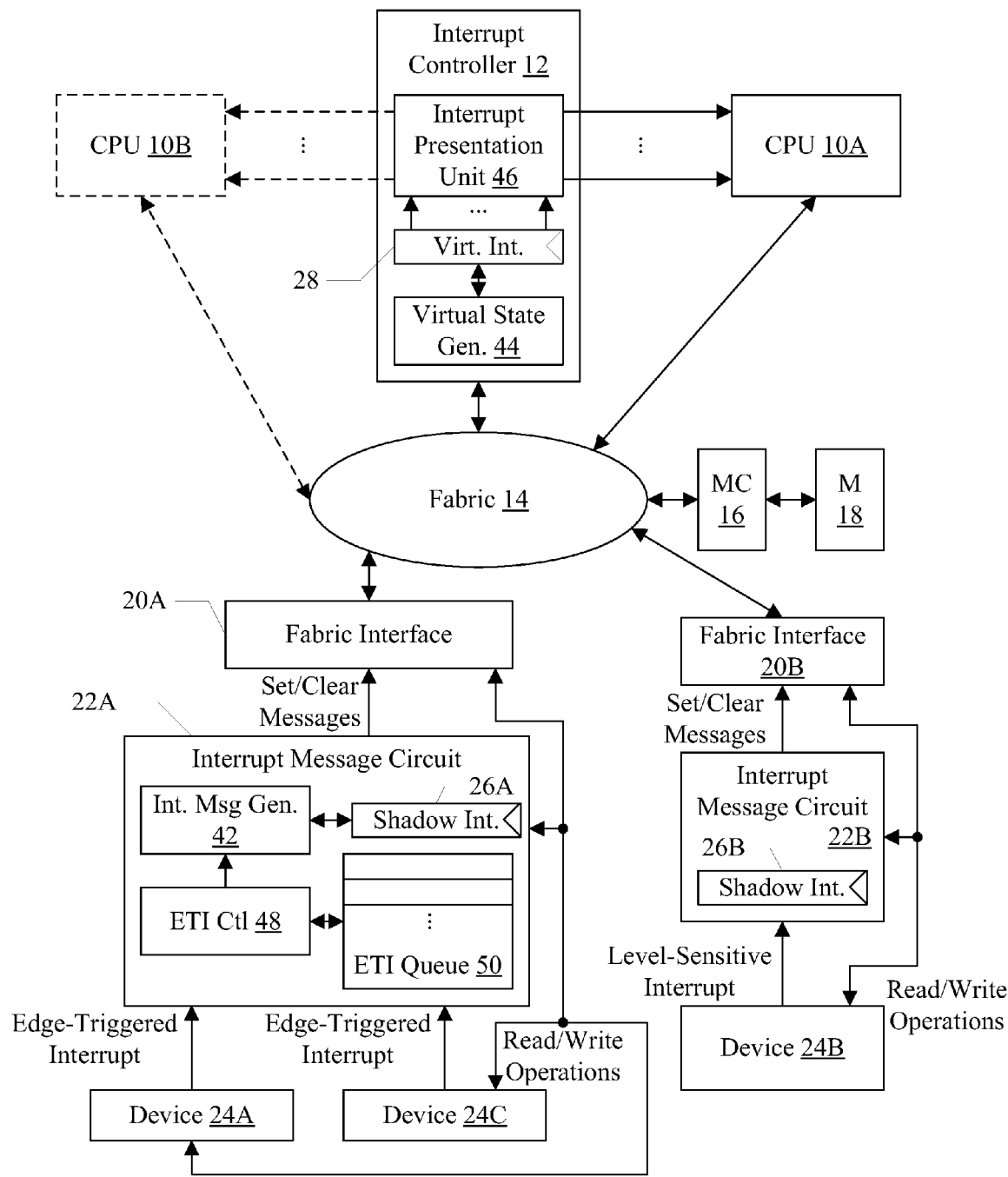
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system is shown. In the embodiment of FIG. 1, the system includes one or more CPUs 10A-10B, an interrupt controller 12, a communication fabric 14, a memory controller 16, a memory 18, fabric interface circuits 20A-20B, interrupt message circuits 22A-22B, and peripheral devices 24A-24C. The CPUs 10A-10B are coupled to the interrupt controller 12, which is coupled to the communication fabric (or more briefly "fabric") 14. The CPUs 10A-10B may also be coupled to the fabric 14. The memory 18 is coupled to the memory controller 16, which is further coupled to the fabric 14. The fabric interface circuits 20A-20B are coupled to the fabric 14 and respective interrupt message circuits 22A-22B. The fabric interface circuit 20A and interrupt message circuit 22A are coupled to peripheral devices 24A and 24C, while the fabric interface circuit 20B and interrupt message circuit 22B are coupled to the peripheral device 24B. In one embodiment, the components illustrated in FIG. 1 except for the memory 18 may be integrated onto a single semiconductor substrate as a system on a chip (SOC). Other embodiments may include the memory 18 on the SOC as well. In yet other embodiments, one or more of the devices 24A-24C may not be included on the SOC, but there may be a peripheral interface circuit configured to communicate on a peripheral interface to the external device 24A-24C. Still other embodiments may implement any amount of discrete circuitry.

The system illustrated in FIG. 1 may support the transmission of level-sensitive interrupt messages to virtualize level sensitive interrupt signals (e.g. the level-sensitive interrupt signal used by the device 24B). Additionally, the system may support conversion of edge-triggered interrupts (e.g. those generated by the devices 24A and 24C in the illustrated embodiment) to level sensitive interrupts. The edge-triggered interrupts may be communicated by the devices in a variety of fashions. For example, an edge-triggered interrupt signal may be used. Alternatively, the devices 24A and 24C may be coupled to a peripheral interface that supports message-signalled interrupts (MSIs), e.g. the Peripheral Component Interface (PCI), PCI Express (PCIe), etc. Thus, the system may receive an edge-triggered interrupt event, which may be an edge on an interrupt signal, an MSI, or any other mechanism for communicating an edge-triggered interrupt.

A given peripheral device 24A-24C may generate various memory operations (read and write operations) to read data from and write data to the memory 18. Read operations may specify a transfer of data from the memory 18 to the device 24A-24C; and write operations may specify a transfer of data from the device 24A-24C to the memory 18. The memory operations may include an address of the location in memory to be read/written, and various other attributes such as the size of the transfer, cacheability, coherency, etc. The device 24A-24C may transmit the operations to the respective fabric interface circuit 20A-20C to transmit over the fabric 14 to the memory controller 16. The interrupt message circuit 22A-22B may also be coupled to receive the memory operations, to monitor for interrupt message insertion.

As mentioned previously, the device 24B may also be configured to generate a level-sensitive interrupt. The interrupt signal may be received by the interrupt message circuit 22B (e.g. the conductor carrying the signal may be coupled to the interrupt message circuit 22B). There may be additional devices in the system similar to the device 24B, and there may be additional interrupt message circuits similar to the interrupt message circuit 22B. Furthermore, there may be additional devices similar to the device 24B coupled to the interrupt message circuit 22B.

Generally, the interrupt message circuit 22A-22B may be configured to issue interrupt messages to convey the status of a level-sensitive interrupt signal. A level-sensitive interrupt signal may be a signal that indicates the request for interrupt (or lack of request) via the level currently transmitted on the signal. For example, an active-high level-sensitive interrupt signal may be asserted high to indicate a request for interrupt and deasserted low to indicate no request for interrupt. An active-low level-sensitive interrupt signal may be asserted low to indicate a request for interrupt and deasserted high to indicate a lack of request for interrupt. Thus, an interrupt request may be indicated by assertion of the level-sensitive interrupt signal, and the continued assertion indicates that the request is still active. Deassertion of the level-sensitive interrupt signal indicates that the interrupt is not requested (either because it has been serviced, or the interrupt is no longer needed for some device-specific reason). By way of contrast, an edge-triggered interrupt signal indicates that an interrupt is requested by the transition from low to high (active-high). The edge-triggered signal does not have a defined meaning for the deassertion of the signal, and does not require continued assertion of the signal to indicate that the interrupt is still requested. Thus, an edge-triggered interrupt signal may be a pulse indicating a request for interrupt. Once an edge-triggered interrupt is requested then the interrupt will be delivered, even if the interrupt is no longer needed/desired by the device that asserted the interrupt.

In the case of the interrupt message circuit 22B, the device 24B transmits a level-sensitive interrupt signal. Accordingly, the interrupt message circuit 22B may transmit corresponding interrupt messages. An interrupt message may be a communication on the fabric 14 that communicates an interrupt signal value to the interrupt controller 12. The interrupt message may appear to be similar to a memory operation (e.g. a write operation), but the routing of the message may not be to the memory controller 16. The write operation may have a designated address that is interpreted by the system as an interrupt message. Alternatively, in a packet-based system, an interrupt message packet may include the interrupt controller 12 as the destination of the packet. Identifying information for the interrupt signal may be provided in the message, or may be inherent in the source of the message. More particularly, in an embodiment, the interrupt messages for the level-sensitive interrupts may include set messages and clear messages. The interrupt set message may be transmitted in response to detecting a change in level from deasserted to asserted (e.g. low to high, for an active high signal). The interrupt clear message may be transmitted in response to detecting a change in level from asserted to deasserted (e.g. high to low, for an active high signal). The interrupt controller 12 may be configured to set the virtual interrupt in response to interrupt set messages and clear the virtual interrupt in response to interrupt clear messages.

The interrupt message circuit 22A may similarly be configured to transmit interrupt set and interrupt clear messages. Since the interrupts from the devices 24A and 24C are edge-triggered, the interrupt message circuit 22A may include circuitry to convert the edge-triggered interrupts to level-triggered interrupts. In the illustrated embodiment, for example, an edge triggered interrupt (ETI) queue 50 and corresponding ETI control circuit 48 may be included. The ETI queue 50 may include multiple queue entries, each configured to store data corresponding to one ETI event. For example, if the ETI event is an MSI, the MSI may be stored in the ETI queue 50. If the ETI event is an edge on an interrupt signal line, data indicating the occurrence of the edge and the source (e.g. the device 24A or 24C) may be stored.

The ETI control circuit 48 may be configured to examine the status of the ETI queue 50, and may be configured to assert a level-sensitive interrupt signal to an interrupt message generator circuit 42 to which the ETI control circuit 48 is coupled based on the status. Various embodiments may assert the interrupt if the queue is not empty, if the queue stores data corresponding to an interrupt that has not been communicated to the interrupt controller 12, etc. The interrupt message generator circuit 42 may generate level-sensitive interrupt messages based on the input from the ETI control circuit 48, in a manner similar to the discussion above with regard to the interrupt message circuit 22B.

In one embodiment, the interrupt messages may be transmitted over the fabric 14 using the same path as the memory operations from the corresponding device 24A-24C. In the embodiment of FIG. 1, for example, the same fabric interface circuit 20A-20B that is used by the corresponding device 24A-24C may be used to transmit the interrupt message. In this fashion, the interrupt message circuit 22A-22B may not add a new master to the fabric 14. Additionally, devices that use interrupt signals and which do not generate interrupt messages may not require redesign to be used in the system. Still further, global routing of the interrupt wires between devices and the interrupt controller may be avoided through the use of the interrupt messages.

The interrupt message circuit 22A-22B may have its own port on the fabric interface circuit 20A-20B, or may share the port on the fabric interface circuit 20A-20B with the corresponding devices 24A-24C. In either case, the interrupt message circuit 22A-22B may monitor the operations from the corresponding devices 24A-24C to ensure that current operations have been transmitted, then may inhibit further transmission by the corresponding device 24A-24C to transmit the interrupt message. Transmitting the interrupt message over the fabric 14 using the same path as the memory operations (at least to the point at which the paths to the interrupt controller 12 and the memory controller 16 diverge in the fabric 14) may ensure that the interrupt message is transmitted after the memory operations that are associated with the interrupt. If the fabric 14 ensures that operations complete in order, the memory operations that precede the interrupt may be globally visible prior to the interrupt message reaching the interrupt controller 12. In other embodiments, the interrupt message circuits 22A-22B may monitor the preceding memory operations for global visibility prior to transmitting the interrupt message or the devices 24A-24B may ensure global visibility prior to asserting the interrupt.

In the illustrated embodiment, the interrupt message circuit 22A-22B may include shadow interrupt flop(s) 26A-26B. The flops 26A-26B may generally be any clocked storage devices (e.g. flops, latches, registers, etc.), and may store the level of the level-sensitive interrupt signal(s) most recently transmitted by the interrupt message circuit 22A-22B to the interrupt controller 12. The level in the flops may be compared to the current level to detect a change in level, which may lead to the generation of an interrupt message. Accordingly, the receiver of the interrupt messages (the interrupt controller 12 in this case) may be informed of each change in level and thus may maintain a virtual copy of the level-sensitive interrupt without receiving the actual wire on which the level-sensitive interrupt signal is carried.

For example, the interrupt messages from the interrupt message circuits 22A-22B may be delivered by the fabric 14 to the interrupt controller 12. The interrupt controller 12 may be configured to maintain a virtual interrupt for each level-sensitive interrupt in virtual interrupt flops 28. Again, the flops 28 may be any clocked storage device, including the examples given above. The interrupt controller 12 may be configured to present interrupts to the CPUs 10A-10B, based on the interrupts that have been requested. As illustrated in FIG. 1, the interrupt controller 12 may be configured to assert one or more interrupts to each CPU 10A-10B. In one embodiment, the device interrupts may be presented to the CPU 10A-10B as one common interrupt signal, and when the CPU 10A-10B acknowledges the interrupt an interrupt vector may be provided. The interrupt vector may be specific to the requesting device. Other interrupts, such as non-maskable interrupts or high priority interrupts, may have separate interrupt signals for presentation to the CPUs 10A-10B.

In the illustrated embodiment, the interrupt controller 12 may include a virtual state generator 44 coupled to receive interrupt messages from the fabric 14. The virtual state generator 44 may be configured to decode the interrupt messages and set or clear virtual interrupt bits in virtual interrupt state flops 28 for set and clear messages, respectively. The output of the virtual interrupt state flops 28 may be a set of virtual interrupts that behave similar to the various level-sensitive interrupt signals, but delayed slightly in time with respect to the signals. The delay may be the propagation delay of the interrupt messages over the fabric 14. The interrupt presentation unit 46 may receive the virtual interrupt signals and may determine which interrupt to present to the CPUs 10A-10B responsive to the virtual interrupt signals and potentially other state such as a priority of the tasks executing on the CPUs 10A-10B, the priority of the interrupts, whether or not interrupts are enabled on the CPU 10A or 10B, etc. The interrupt presentation unit 46 may present the interrupt to the CPU 10A-10B (e.g. asserting an interrupt signal to the CPU 10A-10B).

In some embodiments, the interrupt controller 12 may be configured to present interrupts to non-CPU processors in the system. The non-CPU processors may be special purpose processors such as input/output (I/O) processors dedicated to certain handling I/O interrupts while the CPUs perform other tasks.

The devices 24A-24C may generally be any type of peripheral device or interface, implementing any hardware functionality included in the system other than the CPUs. For example, the devices 24A-24C may include video peripherals such as cameras, camera interfaces, image processors, video encoder/decoders, scalers, rotators, blenders, graphics processing units, display controllers, etc. The devices 24A-24C may include audio peripherals such as microphones, speakers, interfaces to microphones and speakers, audio processors, digital signal processors, mixers, etc. The devices 24A-24C may include interface controllers for various interfaces external to the SOC (for SOC implementations) including interfaces such as Universal Serial Bus (USB), peripheral component interconnect (PCI) including PCI Express (PCIe), serial and parallel ports, etc. The devices 24A-24C may include networking peripherals such as media access controllers (MACs). Any set of hardware may be included. There may be more than two devices 24A-24C in a given system, two are illustrated merely to highlight certain aspects of an embodiment of the system.

The fabric 14 may be any communication interconnect and protocol for communicating among the components of the system. The fabric 14 may be bus-based, including shared bus configurations, cross bar configurations, and hierarchical buses with bridges. The fabric 14 may also be packet-based, and may be hierarchical with bridges, cross bar, point-to-point, or other interconnects. The fabric interface circuits 20A-20B may be part of the fabric 14, and may couple to other such circuits within the fabric 14, in an embodiment.

The interrupt controller 12 may be configured to manage interrupts in the system. The interrupt controller 12 may be configured to receive the interrupts, record them, and present them to the CPUs 10A-10B. The CPUs 10A-10B may be configured to signal interrupts (e.g. inter processor interrupts (IPIs)) through the interrupt controller 12 as well. The interrupt controller 12 may be configured to receive interrupt acknowledgements from the CPUs 10A-10B (and other non-CPU processors to which the interrupt controller 12 presents interrupts, in some embodiments) and may provide interrupt vectors in response to the acknowledgements. The interrupt controller 12 may further receive read/write operations from the interrupted processors to update interrupt state in the interrupt controller 12 (e.g. during execution of interrupt service routine code and/or device driver code).

The memory controller 16 may generally include the circuitry for receiving memory requests from the other components of the system and for accessing the memory 18 to complete the memory requests. The memory controller 16 may be configured to access any type of memory 18. For example, the memory 18 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The CPUs 10A-10B may implement any instruction set and any configuration. The CPUs 10A-10B may be superscalar or scalar, pipelined, in order or out of order, speculative or non-speculative, etc. Any configuration and design may be used. At least one CPU 10A-10B may be included, and more than one (e.g. two as shown in FIG. 1, or more) CPUs may be included.

Figure 2:
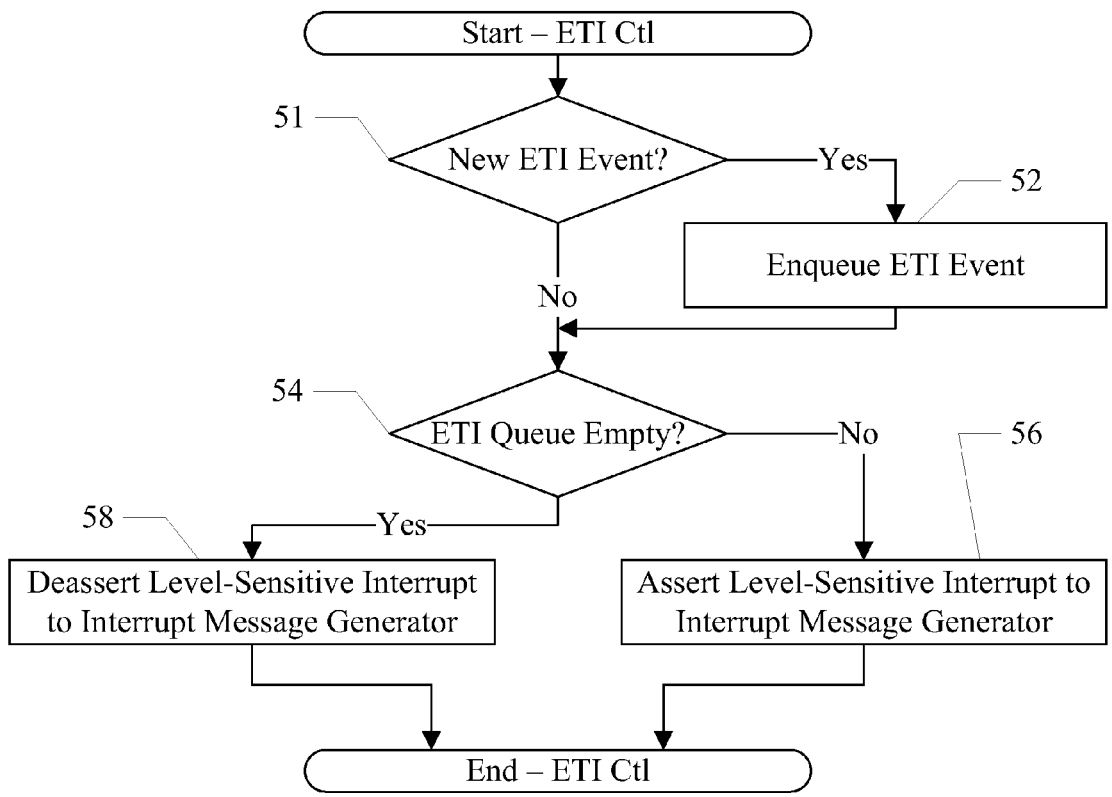
FIG. 2 is a flowchart illustrating operation of one embodiment of an edge-triggered interrupt (ETI) control circuit shown in FIG. 1.

In one embodiment, the ETI control circuit 48 may assert a level-sensitive interrupt in response to the ETI queue 50 being non-empty. Such an embodiment may be used, e.g., if the ETIs are mapped to the same level-sensitive interrupt transmitted to the interrupt controller 12. In such embodiments, software may read the contents of the ETI queue 50 and determine how to handle each interrupt. FIG. 2 is a flowchart illustrating operation of one implementation of such an embodiment of the ETI control circuit 48. While the blocks are shown in a particular order for ease of understanding, other orders may be used. Blocks may be performed in parallel in combinatorial logic in the ETI control circuit 48. Blocks, combinations of blocks, and/or the flowchart as a whole may be pipelined over multiple clock cycles. The ETI control circuit 48 may be configured to implement the operation shown in FIG. 2.

If the ETI control circuit 48 detects a new ETI event arriving at the interrupt message circuit 22A (decision block 51, "yes" leg), the ETI control circuit 48 may cause the ETI queue 50 to enqueue the ETI event (block 52). If the ETI queue 50 is empty (decision block 54, "yes" leg), the ETI control circuit 48 may deassert the level-sensitive interrupt to the interrupt message generator 42 (block 58). If the ETI queue 50 is not empty (e.g. at least one entry has data corresponding to a valid interrupt that has not been read by software) (decision block 54, "no" leg), the ETI control circuit 48 may assert the level-sensitive interrupt to the interrupt message generator 42 (block 56).

Figure 3:
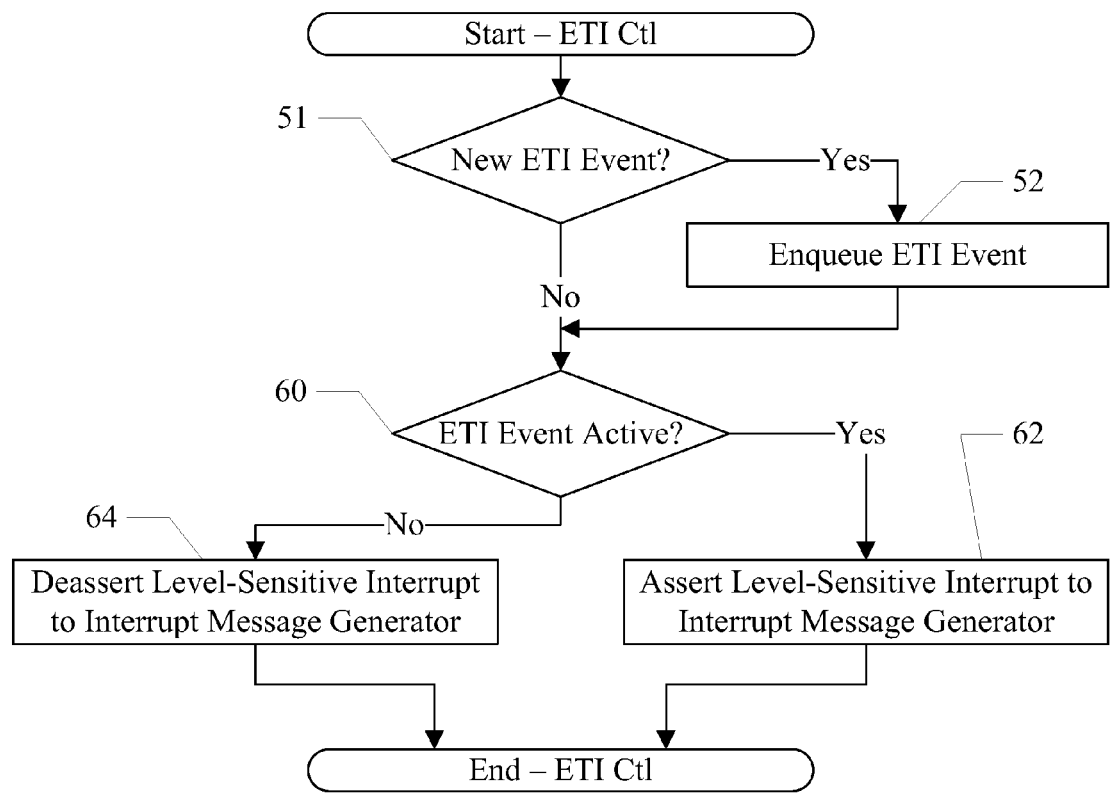
FIG. 3 is a flowchart illustrating operation of another embodiment of the ETI control circuit shown in FIG. 1.

In another embodiment, the ETI control circuit 48 may map ETI events from different sources to different level-sensitive interrupts. Thus, each ETI event may result in the assertion of a different level-sensitive interrupt to the interrupt message generator 42 and a different level-sensitive interrupt message transmitted to the interrupt controller 12. FIG. 3 is a flowchart illustrating operation of one implementation of such an embodiment of the ETI control circuit 48. While the blocks are shown in a particular order for ease of understanding, other orders may be used. Blocks may be performed in parallel in combinatorial logic in the ETI control circuit 48. Blocks, combinations of blocks, and/or the flowchart as a whole may be pipelined over multiple clock cycles. The ETI control circuit 48 may be configured to implement the operation shown in FIG. 3.

Similar to the embodiment of FIG. 2, if the ETI control circuit 48 detects a new ETI event arriving at the interrupt message circuit 22A (decision block 51, "yes" leg), the ETI control circuit 48 may cause the ETI queue 50 to enqueue the ETI event (block 52). If there is at least one active ETI event in the ETI queue 50 (e.g. an interrupt that has not yet been cleared by software) (decision block 60, "yes" leg), the ETI control circuit 48 may assert the level-sensitive interrupt corresponding to the active ETI event to the interrupt message generator 42 (block 62). If not (decision block 60, "no" leg), the ETI control circuit 48 may deassert the level-sensitive interrupt to the interrupt message generator 42 (block 64).

In yet other embodiments, the ETI messages may be passed to the interrupt controller 12 directly. Each ETI message may contain a different address or other value that may identify the interrupt and/or the source device 24A or 24C. The interrupt controller 12 may treat the messages as interrupt set messages, converting them to level-sensitive interrupts. More particularly, the virtual state generator 44 may decode the messages and set the corresponding interrupts in the virtual interrupt state. In one such embodiment, the acknowledgement of the interrupt by the CPU 10A-10B may be used as an interrupt clear to clear the corresponding interrupt in the virtual interrupt state.

The above discussion is one example of how ETI messages may be handled at the interrupt controller 12 if the ETI messages are sent directly to the interrupt controller 12. In general, the interrupt controller 12 may receive interrupt set messages (the ETI messages), but may no receive interrupt clear messages since the ETI messages are communicating edge-triggered interrupts. The virtual interrupt state for the ETI events may be cleared in a variety of ways in various embodiments. For example, software my clear the virtual interrupt state (e.g. as part of the interrupt service routine). Alternatively, various hardware implementations may be used, including the implementation described above in which the interrupt acknowledgement is used to clear the virtual interrupt state. Other embodiments may clear the virtual interrupt state when the specific interrupt is signaled to the CPU (e.g. when the interrupt vector is delivered) or when software indicates to the interrupt controller 12 that it is finished with that interrupt.

Figure 4:
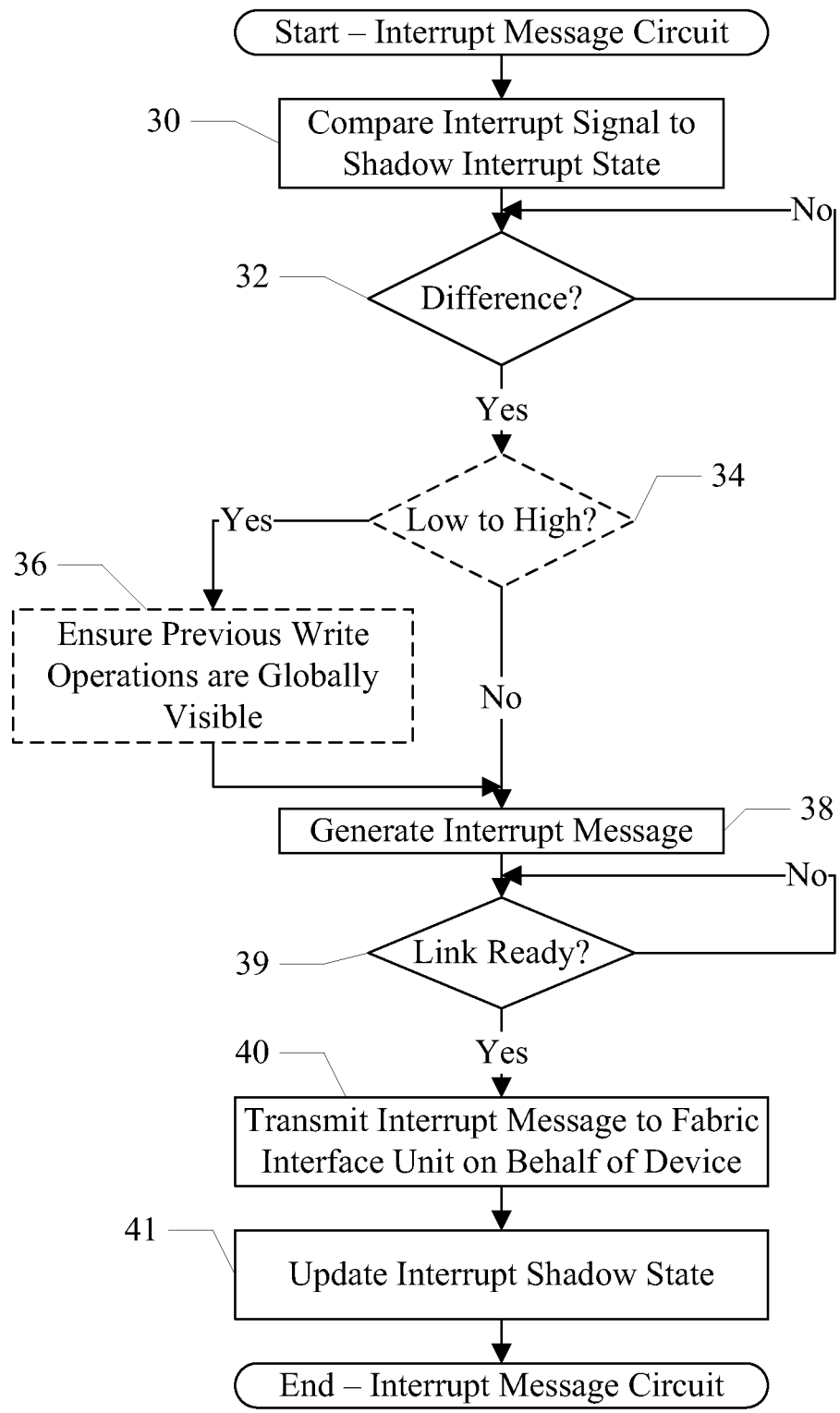
FIG. 4 is a flowchart illustrating operation of one embodiment of an interrupt message circuit shown in FIG. 1.

Turning now to FIG. 4, a flowchart is shown illustrating operation of one embodiment of an interrupt message circuit 22A-22B. More particularly, FIG. 4 may illustrate operation of the interrupt message generator 42 in the interrupt message circuit 22A, with respect to level-sensitive interrupt signals generated by the ETI control circuit 48. The interrupt message circuit 22B may also include an interrupt message generator 42 configured to process the level-sensitive interrupt signal from the device 24B. Still other embodiments may include a combination of externally-received level-sensitive interrupts and internally-generated level-sensitive interrupts (from ETI events). While the blocks are shown in a particular order for ease of understanding, other orders may be used. Blocks may be performed in parallel in combinatorial logic in the interrupt message circuit 22A-22B. Blocks, combinations of blocks, and/or the flowchart as a whole may be pipelined over multiple clock cycles. The operation illustrated in FIG. 4 pertains to one level-sensitive interrupt signal. Similar operation may be performed in parallel for each level-sensitive interrupt signal managed by the interrupt message circuit 22A-22B. The interrupt message circuit 22A-22B may be configured to implement the operation shown in FIG. 4.

The interrupt message circuit 22A-22B may be configured to compare the level of the interrupt signal to the corresponding shadow interrupt state (e.g. the level of the interrupt signal when last transmitted to the interrupt controller 12 by the interrupt message circuit 22A-22B, stored in the flop 26A-26B) (block 30). If there is a difference in the shadow interrupt state and the current level (decision block 32, "yes" leg), the interrupt message circuit 22A-22B may optionally determine if each preceding write operation issued by the corresponding device 24A-24C is globally visible (decision block 34, "yes" leg and block 36). Blocks 34 and 36 may be optional because some embodiments of the fabric 14 may ensure by design that the preceding write operations are globally visible prior to the interrupt message from the interrupt message circuit 22A-22B reaching the interrupt controller 12. For example, the fabric 14 may include a coherence point at which memory operations become globally visible, and the interrupt messages may travel through the coherence point behind write operations issued by the device 24A-24C, thus ensuring that the writes will be globally visible prior to the interrupt message reaching the interrupt controller. Alternatively, the device 24A-24C may be configured to ensure that the memory operations are globally visible prior to asserting the interrupt. Blocks 34 and 36 may be eliminated in such embodiments as well.

The interrupt message circuit 22A-22B may be configured to generate an interrupt message (block 38). The interrupt message circuit 22A-22B may wait until the link is ready for insertion of the interrupt message (decision block 39). The link may be viewed as ready if the current memory operations from the device 24A-24C have been sent (e.g. read requests and write requests and write data have been sent). When the link is ready (decision block 39, "yes" leg), the interrupt message circuit 22A-22B may be configured to inhibit transmission of additional memory operations from the device 24A-24B to transmit the generated interrupt message on the fabric 14 on behalf of the device 24A-24C (block 40). After the interrupt message has been sent, the interrupt message circuit 22A-22B may permit transmission of additional memory operations from the device 24A-24C. In response to transmitting the interrupt message, the interrupt message circuit 22A-22B may update the shadow interrupt state 26A-26B to reflect the transmitted level (block 41).

Figure 5:
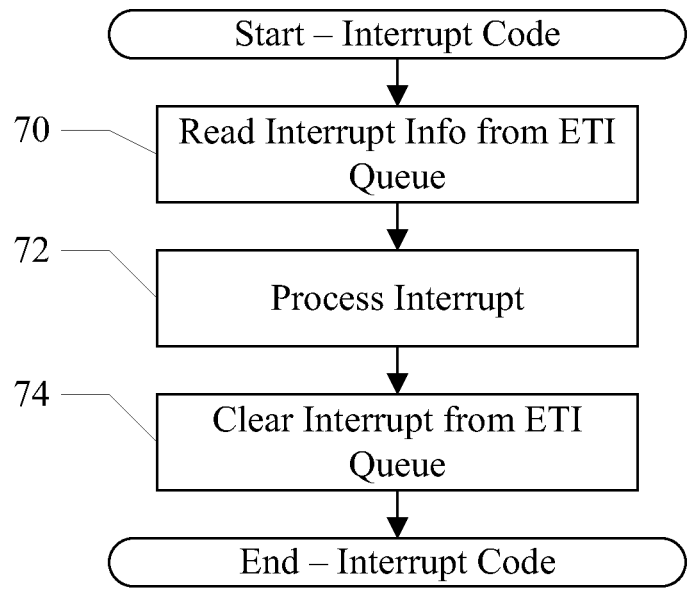
FIG. 5 is a flowchart illustrating operation of one embodiment of interrupt code.

FIG. 5 is a flowchart illustrating operation of one embodiment of interrupt code and/or driver code that may be executed by a CPU 10A-10B in response to a level-sensitive interrupt that is mapped to the ETI queue 50. While the blocks are shown in a particular order for ease of understanding, other orders may be used. The interrupt code and/or driver code may include instructions which, when executed by a CPU 10A-10B, implement the operation illustrated in FIG. 5.

The code may read the interrupt information from the ETI queue 50 (block 70). The interrupt information may pertain to the specific interrupt identified by the level-sensitive interrupt, for embodiments in which each ETI event is mapped to a different level-sensitive interrupt (e.g. FIG. 3). Alternatively, the interrupt information may correspond to each interrupt outstanding in the ETI queue 50, in cases in which the level-sensitive interrupt indicates that the ETI queue 50 is not empty (e.g. FIG. 2). The code may process the interrupt(s) indicated by the ETI queue 50 (block 72). Processing the interrupt may include performing the service needed by the device. The code may clear the interrupt from the ETI queue 50 (block 74). Clearing the interrupt from the ETI queue 50 may include invalidating the interrupt information in the queue entry, advancing a queue pointer so that the entry is no longer stored in the queue, etc.

Figure 6:
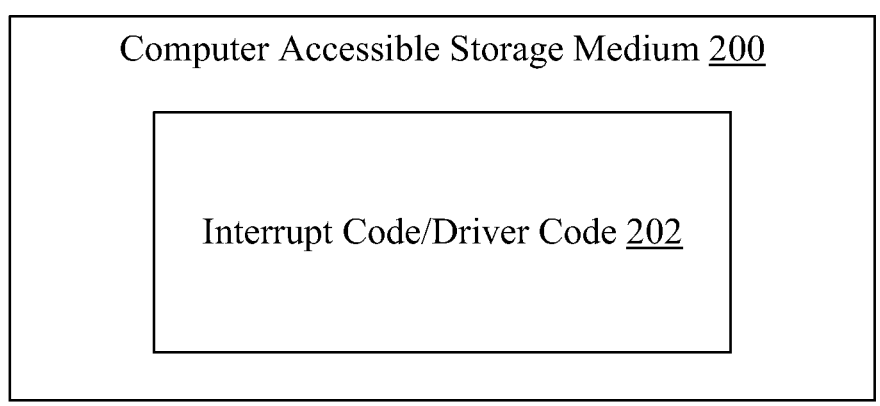
FIG. 6 is a block diagram of one embodiment of a computer accessible storage medium.

Turning now to FIG. 6, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 6 may store the interrupt code/driver code 202. The interrupt code/driver code 202 may include instructions which, when executed by a CPU 10A-10B, implement the operation described for the interrupt code/driver code above, particularly with regard to FIG. 5. A carrier medium may include computer accessible storage media as well as transmission media such as wired or wireless transmission.

Figure 7:
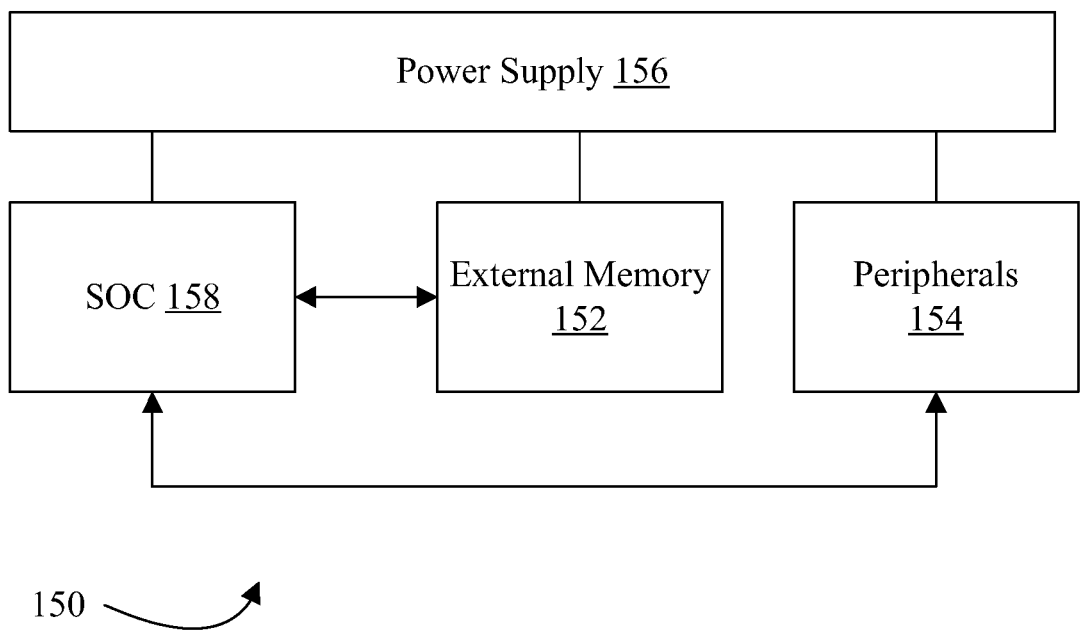
FIG. 7 is a block diagram of one embodiment of a system.

Turning now to FIG. 7, a block diagram of one embodiment of a system 150 is shown. In the illustrated embodiment, the system 150 includes at least one instance of an SOC 158 coupled to one or more peripherals 154 and an external memory 152. A power supply 156 is provided which supplies the supply voltages to the SOC 158 as well as one or more supply voltages to the memory 152 and/or the peripherals 154. In some embodiments, more than one instance of the SOC 158 may be included (and more than one memory 152 may be included as well).

The SOC 158 may include the components of the SOC as described for some embodiments of FIG. 1, above.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

In an embodiment, one or more of the peripherals 154 may be configured to assert interrupts to the SOC 158. The peripheral interface circuit coupled to such a peripheral may be a device 24A-24C in the SOC 158, and the corresponding interrupt message circuit 22A-22B may generate interrupt messages in response to the interrupts. The interrupts may be level-sensitive or edge-triggered, in an embodiment.

The external memory 152 may include any type of memory. For example, the external memory 152 may be SRAM, dynamic RAM (DRAM) such as synchronous DRAM (SDRAM), double data rate (DDR, DDR2, DDR3, etc.) SDRAM, RAMBUS DRAM, etc. The external memory 152 may include one or more memory modules to which the memory devices are mounted, such as single inline memory modules (SIMMs), dual inline memory modules (DIMMs), etc. Alternatively, the external memory 152 may include one or more memory devices that are mounted on the SOC 10 in a chip-on-chip or package-on-package implementation. The external memory 152 may include the memory 18 shown in FIG. 1, for example.

Numerous variations and modifications will become apparent to those skilled in the art once the above disclosure is fully appreciated. It is intended that the following claims be interpreted to embrace all such variations and modifications.

What is claimed is:

1. A method comprising:
   receiving an edge-triggered interrupt event generated by a peripheral device in a system;
   converting the edge-triggered interrupt event into a level-sensitive interrupt in the system by an interrupt message circuit that is coupled to receive the edge-triggered interrupt event; and
   interrupting a processor in the system responsive to the level-sensitive interrupt, the interrupting comprising generating an interrupt message by the interrupt message circuit to deliver the level-sensitive interrupt to an interrupt controller over a communication fabric in the system, and the interrupt message is an interrupt set message.

2. The method as recited in claim 1 further comprising enqueuing the edge-triggered interrupt event in a queue within the interrupt message circuit.

3. The method as recited in claim 2 further comprising reading the edge-triggered interrupt event from the queue and processing the edge-triggered interrupt event.

4. An apparatus comprising:
   one or more devices configured to generate edge-triggered message-signalled interrupts; and
   a circuit coupled to receive the edge-triggered message-signalled interrupts and configured to capture the edge-triggered message-signalled interrupts, and wherein the circuit is configured to transmit a level-sensitive interrupt message to an interrupt controller in response having at least one edge-triggered message-signalled interrupt pending, wherein the level-sensitive interrupt message is an interrupt set message, and wherein the interrupt controller is configured to set a corresponding virtual interrupt in response to the interrupt set message.

5. The apparatus as recited in claim 4 wherein the circuit comprises a queue configured to store a plurality of edge-triggered message-signalled interrupts.

6. The apparatus as recited in claim 5 wherein the circuit is configured to associate a single level-sensitive interrupt message with the queue.

7. The apparatus as recited in claim 5 wherein the circuit is configured to associate a different level-sensitive interrupt message with each edge-triggered message-signalled interrupt in the queue.

8. A system comprising:
   one or more central processing units (CPUs);
   an interrupt controller coupled to the CPUs and configured to present interrupts to the CPUs;
   a communication fabric coupled to the interrupt controller, wherein the communication fabric is configured to provide interrupt messages conveying level-sensitive interrupts to the interrupt controller;
   a plurality of devices coupled to the communication fabric and configured to issue interrupts, wherein and least a first device of the plurality of devices is configured to issue edge-triggered interrupts; and
   a circuit coupled to the first device configured to issue level-sensitive interrupt set messages on the communication fabric in response to the edge-triggered interrupts issued by the first device, wherein the interrupt controller is configured to set a corresponding virtual interrupt in response to the interrupt set message.

9. The system as recited in claim 8 wherein a second device of the plurality of devices is configured to issue level-sensitive interrupts, and wherein a second circuit coupled to the second device is configured to use interrupt set and interrupt clear messages to transmit the level-sensitive interrupts to the interrupt controller.

10. The system as recited claim 8 further comprising a non-transitory computer accessible storage medium storing a plurality of instructions executable by the one or more CPUs in response to an interrupt presented by the interrupt controller, wherein the plurality of instructions, when executed, service the first device.

11. The system as recited in claim 9 wherein the interrupt controller is configured to set a virtual interrupt corresponding to a given level-sensitive interrupt responsive to the interrupt set message, and wherein the interrupt controller is configured to clear the virtual interrupt responsive to the interrupt clear message.

12. The system as recited in claim 10 wherein the circuit comprises a queue configured to store data corresponding to a plurality of edge-triggered interrupts, and wherein the plurality of instructions, when executed, read data corresponding to the edge-triggered interrupt from the first device from the queue.

13. The system as recited in claim 12 wherein the plurality of instructions, when executed, clear the data corresponding to the edge-triggered interrupt from the queue.

14. The system as recited in claim 12 wherein the edge-triggered interrupt is transmitted to the circuit in a message-signalled interrupt packet, and wherein the data comprise the message signalled interrupt.

15. A non-transitory computer accessible storage medium storing a plurality of instructions which, when executed by a processor in response to an edge-triggered interrupt event issued by a first device in a system that includes the processor:
   reads data from a queue, the data corresponding to the edge-triggered interrupt event and stored in the queue by a circuit that transmits a corresponding level-sensitive interrupt to the interrupt controller to interrupt the processor; and accesses the first device.

16. The non-transitory computer accessible storage medium as recited in claim 15 wherein the plurality of instructions, when executed, clear the data corresponding to the edge-triggered interrupt event from the queue.

17. The non-transitory computer accessible storage medium as recited in claim 15 wherein the edge-triggered interrupt event comprises a message-signalled interrupt.

18. The non-transitory computer accessible storage medium as recited in claim 15 wherein the edge-triggered interrupt event comprises an edge-triggered interrupt on an interrupt signal line.

* * * * *